United States Patent [19]

Lopez-Ramirez

[11] Patent Number: 5,463,633
[45] Date of Patent: Oct. 31, 1995

[54] USE OF AT COMMANDS TO TEST MODEM WITH HP3065

[75] Inventor: Juan Lopez-Ramirez, El Paso, Tex.

[73] Assignee: Rockwell International Corporation, Seal Beach, Calif.

[21] Appl. No.: 199,437

[22] Filed: Feb. 22, 1994

[51] Int. Cl.[6] .................................................. G06F 11/00
[52] U.S. Cl. ...................... 371/20.3; 375/222; 375/224
[58] Field of Search ............................... 371/20.3, 20.1, 371/20.4, 15.1; 375/8, 10, 3.1; 379/1

[56] References Cited

U.S. PATENT DOCUMENTS

| | | |
|---|---|---|
| 3,692,939 | 9/1972 | Knight et al. . |
| 3,743,938 | 7/1973 | Davis . |
| 4,351,059 | 9/1982 | Gregoire et al. . |
| 4,385,384 | 5/1983 | Rosbury et al. ............ 371/22.1 |
| 4,620,294 | 10/1986 | Leung et al. .............. 375/46 |
| 4,956,852 | 9/1990 | Hodge ......................... 371/8 |
| 5,040,181 | 8/1991 | Roux .......................... 375/10 |

FOREIGN PATENT DOCUMENTS

| | | | |
|---|---|---|---|
| 185449 | 10/1984 | Japan | H04L 13/00 |
| 105545 | 5/1987 | Japan | H04L 1/24 |
| 281546 | 12/1987 | Japan | H04L 13/00 |
| 0342945 | 2/1991 | Japan | H04L 29/14 |
| 283934 | 12/1991 | Japan | H04J 3/14 |
| 04924 | 1/1992 | Japan | H04B 17/00 |
| 372259 | 12/1992 | Japan | H04M 11/00 |
| 244222 | 9/1993 | Japan | H04L 29/10 |

*Primary Examiner*—Robert W. Beausoliel, Jr.
*Assistant Examiner*—Albert Decady
*Attorney, Agent, or Firm*—George A. Montanye; Charles T. Silberberg; Tom Streeter

[57] ABSTRACT

A modem is tested using HP3065 with AT commands. The modem is tested as a whole, thereby assuring that the correct components are being used and that they will work with one another.

6 Claims, 1 Drawing Sheet

USE OF AT COMMANDS TO TEST MODEM WITH HP3065

BACKGROUND OF THE INVENTION

This invention pertains to methods of testing a modem using HP3065 and has particular reference to methods which use AT commands.

The conventional method of testing a modem using HP3065 is to test its components separately. This method is unsatisfactory because it does not assure that the components will work with one another.

SUMMARY OF THE INVENTION

The present invention overcomes these limitations of the prior art by use of AT commands. These test the modem as a whole.

DETAILED DESCRIPTION OF A PREFERRED EMBODIMENT

Figure 1:
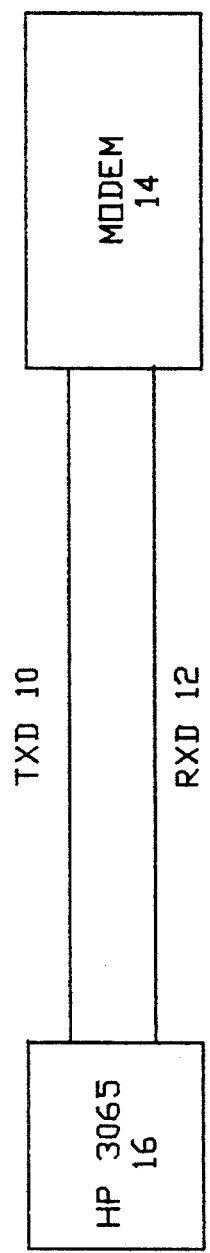
FIG. 1 shows a modem connected to a tester through a TXD line and an RXD line.
Figure 2:
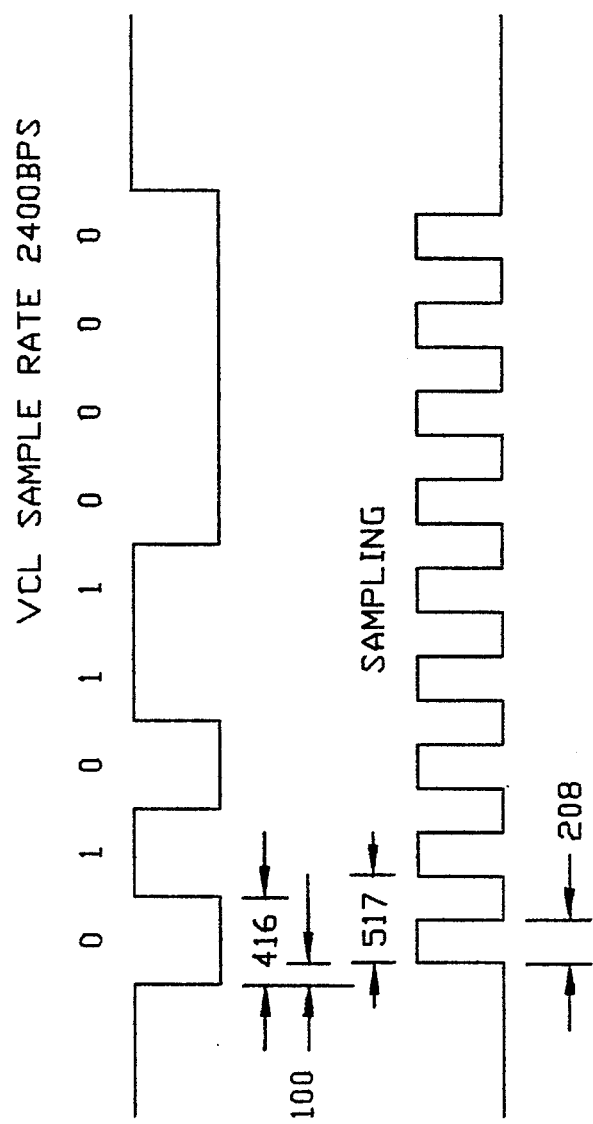
FIG. 2 shows a VCL (Vector Control Language) timing diagram for a typical 2400 BPS modem, together with the sampling scheme; times are in uS.

In FIG. 1, TXD 10 and RXD 12 are shown running between a modem 14 and a tester 16. TXD stands for Transmit Data; it is the line through which the tester 16 transmits signals to the modem 14. RXD stands for Receive Data; it is the line through which the tester 16 receives signals from the modem 14.

To assure that the modem 14 is functional, the tester 16 sends a series of AT commands over the TXD 10. AT stands for Attention. Many AT commands exist in addition to AT itself, such as ATZ, ATDT6, ATA, etc. If the modem 14 is operating correctly, it will send the correct response back to the tester 16 over the RXD 12.

The modem 14 is a serial device; it receives serial commands and produces serial responses. For example, when it receives the command "AT CR" (where "CR"="carriage return"), it should produce the response "CR LF O K CR LF" (where "LF"="line feed").

How is this to be mechanized? The ASCII code for "T" is "01010100". The code for "send the next eight bits" is "0". All ASCII codes are transmitted from right to left with 8 bits plus one start bit. It is therefore necessary to transmit, in order, 0,0,0,1,0,1,0,1,0.

How is a 0 to be transmitted? Suppose that the tester 16 operates with a vector cycle of 1 microsecond and that the modem 14 requires an incoming bit to be valid for 416 uS. The following set of instructions, entitled Send_0, will produce the correct "0" bit:

```
repeat 416 times
        execute TXD_LOW_CHECK_RXD
end repeat
```

E101
To produce a "1" bit, use the following instructions, entitled Send_1:

```
repeat 416 times
        execute TXD_HIGH_CHECK_RXD
end repeat
```

It is important to repeat TXD_LOW_CHECK_RXD, or TXD_HIGH_CHECK RXD, and not just TXD_LOW, or TXD_HIGH, since the RXD line must also be checked every microsecond to assure that the modem 14 is mirroring back to the tester 16 whatever the tester 16 is sending to the modem 14. (Letter "A" in binary ASCII is "1000001". Therefore, sending "A" is equivalent to send "010000010" Since this binary number is the same from right to left and left to right, "A" is a bad example to explain the serial mechanism.)

Send_T is therefore:

```
Send_0
Send_0
Send_0
Send_1
Send_0
Send_1
Send_0
Send_1
Send_0
```

Similarly, the output of the modem 14 (once the tester 16 has finished its command) may be checked for the correct string of "0"s and "1"s. Assume that the output pulse from the modem 14 is a "0" and lasts for 416 uS. It is wise to stay away from the edges of the pulse, and to sample only the center half, i.e., the center 208 uS. After a suitable delay (perhaps 100 uS, described below), the "0" can be checked for by the following instructions, entitled Check_0:

```
repeat 208 times
        execute CHECK_RXD_LOW
end repeat
repeat 209 times
        execute DUMMY
end repeat
```

"1" is checked for by the following instructions, entitled Check_1:

```
repeat 208 times
        execute CHECK_RXD_HIGH
end repeat
repeat 209 times
        execute DUMMY
end repeat
```

Check_CR (carriage return, including the initial "0") is therefore:

```
Check_0
Check_1
Check_0
Check_1
Check_1
Check_0
Check_0
```

-continued

```
                Check_0
                Check_0
```

The following routine sends the attention command (A T CR) and verifies the answer back from the modem 14 (CR LF O K CR LF):

```
unit "AT"
        call Send_A
        call Set_TXD_High
        call Send_T
        call Set_TXD_High
        call Send_CR
        execute TXD_idle
    call Wait_100mS
        call Wait_10mS
        call Wait_10mS
        call Wait_for_start_bit
        call Wait_100mS
        call Check_answer_CR
        call Make_sure_RXD_is_high
        call Wait_for_start_bit
        call Wait_100mS
        call Check_answer_LF
        call Make_sure_RXD_is_high
        call Wait_for_start_bit
        call Wait_100mS
        call Check_answer_O
        call Make_sure_RXD_is_high
        call Wait_for_start_bit
        call Wait_100mS
        call Check_answer_K
        call Make_sure_RXD_is_high
        call Wait_for_start_bit
        call Wait_100mS
        call Check_answer_CR
        call Make_sure_RXD_is_high
        call Wait_for_start_bit
        call Wait_100mS
        call Check_answer_LF
        call Make_sure_RXD_is_high
end unit
```

Several of these routines, including, in particular:

```
Set_TXD_High
TXD_idle
Wait_100mS
Wait_10mS
Wait_for_start_bit
Make_sure_RXD_is_high
``` are well known in the art. Tools to develop these routines appear in such publications as HP3065 X/L Volume I, Chapter 23, the disclosure of which is incorporated herein by reference.

Using AT commands will test the modem 14 as a unit, at its ordinary operating speed, rather than simply testing each of its component parts in isolation. Incorrect parts, such as a 250 nS memory instead of the correct 55 nS memory, will correctly test this way as defective. The tester 16 would incorrectly test the 250 nS memory, in isolation, as satisfactory.

Industrial Applicability

The present invention can be used whenever it is desired to test a modem. It may be made from components which, separate and apart from one another, are entirely conventional, or it can be made from their non-conventional analogs. The "AT commands" parallel version has been developed applying the ideas described in this invention, and both serial and parallel versions can be used by HP3065 to test modems.

While a particular embodiment of the present invention has been described in some detail, the true spirit and scope of the present invention are not limited thereto, but are limited only by the following claims.

What is claimed is:

1. A method for testing a modem, the method comprising:
   (a) transmitting to the modem, in 1s and 0s, binary representantions of "A", "T", and "<<Carriage returns>>", wherein:
      (1) each 0 transmission comprises a repeated cycle of:
         (A) placing a low voltage on a transmission line to the modem; and
         (B) checking for the low voltage on a receiving line from the modem;
      (2) each 1 transmission comprises a repeated cycle of:
         (A) placing a high voltage on the transmission line to the modem; and
         (B) checking for the high voltage on the receiving line from the modem; and
      (3) each transmission, whether of a 1 or of a 0, takes place during a central half of a sampling interval dictated by the modem; and
   (b) receiving from the modem, in 1s and 0s, binary representantions of a group consisting of at least one character, wherein the acceptability of the group in response to the transmission is dictated by the modem, and wherein:
      (1) each 0 receipt comprises a repeated cycle of checking for the low voltage on the receiving line from the modem;
      (2) each 1 receipt comprises a repeated cycle of checking for the high voltage on the receiving line from the modem; and
      (3) each receipt, whether of a 1 or of a 0, takes place during the central half of the sampling interval dictated by the modem.

2. The method of claim 1, wherein, in the receiving step, the group of characters consists of "<<Carriage return>>", "<<Line Feed>>", "O", "K", "<<Carriage return>>", and "<<Line Feed>>".

3. A method for testing a modem, the method comprising:
   (a) transmitting to the modem, in 1s and 0s, binary representations of "T", and "<Carriage return>", wherein:
      (1) each 0 transmission comprises a repeated cycle of:
         (A) placing a low voltage on a transmission line to the modem; and
         (B) checking for the low voltage on a receiving line from the modem;
      (2) each 1 transmission comprises a repeated cycle of:
         (A) placing a high voltage on the transmission line to the modem; and
         (B) checking for the high voltage on the receiving line from the modem; and
      (3) each transmission, whether of a 1 or of a 0, takes place during a central half of a sampling interval dictated by the modem,
   the transmitting step further comprising the step of transmitting at least one additional character having an acceptability dictated by the modem, said further step taking place between the step of transmitting the "A" and the step of transmitting the "<Carriage return>"; and
   (b) receiving from the modem, in 1s and 0s, binary representations of a group consisting of at least one character, wherein an acceptability of the group in response to the transmission is dictated by the modem, and wherein:
  (1) each 0 receipt comprises a repeated cycle of checking for the low voltage on the receiving line from the modem;
  (2) each 1 receipt comprises a repeated cycle of checking for the high voltage on the receiving line from the modem;
  (3) each receipt, whether of a 1 or of a 0, takes place during the central half of the sampling interval dictated by the modem; and
  (4) the group of characters consists of a group of characters having an acceptability dictated by the modem.

4. An apparatus for testing a modem, the apparatus comprising:
  (a) means for transmitting to the modem, in 1s and 0s, binary representantions of "A", "T", and "<<Carriage returns>>", wherein:
    (1) each 0 transmission comprises a repeated cycle of:
      (A) placing a low voltage on a transmission line to the modem; and
      (B) checking for the low voltage on a receiving line from the modem;
    (2) each 1 transmission comprises the repeated cycle of:
      (A) placing a high voltage on the transmission line to the modem; and
      (B) checking for the high voltage on the receiving line from the modem; and
    (3) each transmission, whether of a 1 or of a 0, takes place during a central half of a sampling interval dictated by the modem; and
  (b) means for receiving from the modem, in 1s and 0s, binary representantions of a group consisting of at least one character, wherein the acceptability of the group in response to the transmission is dictated by the modem, and wherein:
    (1) each 0 receipt comprises a repeated cycle of checking for the low voltage on the receiving line from the modem;
    (2) each 1 receipt comprises a repeated cycle of checking for the high voltage on the receiving line from the modem; and
    (3) each receipt, whether of a 1 or of a 0, takes place during the central half of the sampling interval dictated by the modem.

5. The apparatus of claim 4, wherein, in the receiving means, the group of characters consists of "<<Carriage return>>", "<<Line Feed>>", "O", "K", "<<Carriage return>>", and "<<Line Feed>>".

6. An apparatus for testing a modem, the apparatus comprising:
  (a) means for transmitting to the modem, in 1s and 0s, binary representations of "A", "T", and "<Carriage return>", wherein:
    (1) each 0 transmission comprises a repeated cycle of:
      (A) placing a low voltage on a transmission line to the modem; and
      (B) checking for the low voltage on a receiving line from the modem;
    (2) each 1 transmission comprises the repeated cycle of:
      (A) placing a high voltage on a transmission line to the modem; and
      (B) checking for the high voltage on the receiving line from the modem; and
    (3) each transmission, whether of a 1 or of a 0, takes place during a central half of a sampling interval dictated by the modem; and
    (4) the transmitting means further comprises means for transmitting at least one additional character having an acceptability dictated by the modem, said transmission taking place between the transmission of the "A" and the transmission of the "<Carriage return>"; and
  (b) means for receiving from the modem, in 1s and 0s, binary representations of a group consisting of at least one character, wherein an acceptability of the group in response to the transmission is dictated by the modem, and wherein:
    (1) each 0 receipt comprises a repeated cycle of checking for the low voltage on the receiving line from the modem;
    (2) each I receipt comprises a repeated cycle of checking for the high voltage on the receiving line from the modem;
    (3) each receipt, whether of a 1 or of a 0, takes place during the central half of the sampling interval dictated by the modem; and
    (4) the group of characters consists of a group of characters having an acceptability dictated by the modem.

\* \* \* \* \*